US00RE38211E

(19) United States
(12) Reissued Patent
Peterson et al.

(10) Patent Number: US RE38,211 E
(45) Date of Reissued Patent: Aug. 12, 2003

(54) UNI-DIRECTIONAL CORD TAKE-UP DEVICE

(76) Inventors: Edwin R. Peterson, deceased, late of Boise, ID (US); by Buckner A. Harris, legal representative, 3054 N. 24th St., Boise, ID (US) 83702; Edwin L. Wheeler, 6975 E. Greens Dr., Nampa, ID (US) 83687

(21) Appl. No.: 09/598,779

(22) Filed: Jun. 21, 2000

Related U.S. Patent Documents

Reissue of:
(64) Patent No.: 5,797,558
Issued: Aug. 25, 1998
Appl. No.: 08/751,878
Filed: Nov. 18, 1996

U.S. Applications:
(63) Continuation-in-part of application No. 08/600,406, filed on Feb. 12, 1996, now Pat. No. 5,655,726.

(51) Int. Cl.[7] ..... B65H 75/48
(52) U.S. Cl. ..... 242/373; 242/378.2
(58) Field of Search ..... 242/375.1, 378, 242/378.1, 378.2, 378.3, 376, 376.1, 373; 191/12.2 R

(56) References Cited

U.S. PATENT DOCUMENTS

| | | | | | |
|---|---|---|---|---|---|
| 447,889 | A | * | 3/1891 | Matteson | 242/378.3 |
| 1,446,410 | A | * | 2/1923 | Bennett et al. | 242/378.2 |
| 2,031,434 | A | * | 2/1936 | Stern et al. | 242/378.2 |
| 3,211,496 | A | | 10/1965 | Zaydel | |
| 3,246,363 | A | | 4/1966 | Rogas et al. | |
| 3,657,491 | A | * | 4/1972 | Ryder et al. | 242/378 |
| 3,854,017 | A | * | 12/1974 | Crim | 242/378 |
| 4,417,703 | A | | 11/1983 | Weinhold | |
| 4,733,832 | A | * | 3/1988 | Napierski | 242/378 |
| 4,946,010 | A | | 8/1990 | DiBono | |
| 4,989,805 | A | * | 2/1991 | Burke | 242/378.2 |
| 5,022,600 | A | | 6/1991 | Blanc et al. | |
| 5,094,396 | A | * | 3/1992 | Burke | 242/378.2 |
| 5,114,091 | A | * | 5/1992 | Peterson et al. | 242/378.3 |
| 5,230,481 | A | * | 7/1993 | Wheeler et al. | 242/378.2 |
| 5,332,171 | A | * | 7/1994 | Steff | 242/378 |
| 5,629,826 | A | | 5/1997 | Roca et al. | |
| 5,655,726 | A | | 8/1997 | Peterson et al. | 242/378.2 |
| 5,718,310 | A | | 2/1998 | Gallo | 191/12.2 R |
| 5,961,062 | A | | 10/1999 | Beihl | 242/400.1 |

* cited by examiner

*Primary Examiner*—John M. Jillions
(74) *Attorney, Agent, or Firm*—Frank J. Dykas; Stephen M. Nipper; Derek H. Maughan

(57) ABSTRACT

The invention is a dual reel cord take-up device for flat wire cable which as a generally semi-cylindrical upper and lower case half which [snap] *attach* together over a dual-purpose shaft to make two compartments. The first compartment is a cord extension and take-up compartment which is divided in two by a slotted disk on the dual-purpose shaft in that compartment. Flat wire cable is wound on the dual-purpose shaft in both compartments, and extends through two apertures in the walls of the compartment. The cable in one aperture is fixed so it does not move in and out of the aperture. The wire cable in the second aperture is free to extend or retract through the aperture. A spring provides the power to retract cable into the take-up device.

5 Claims, 6 Drawing Sheets

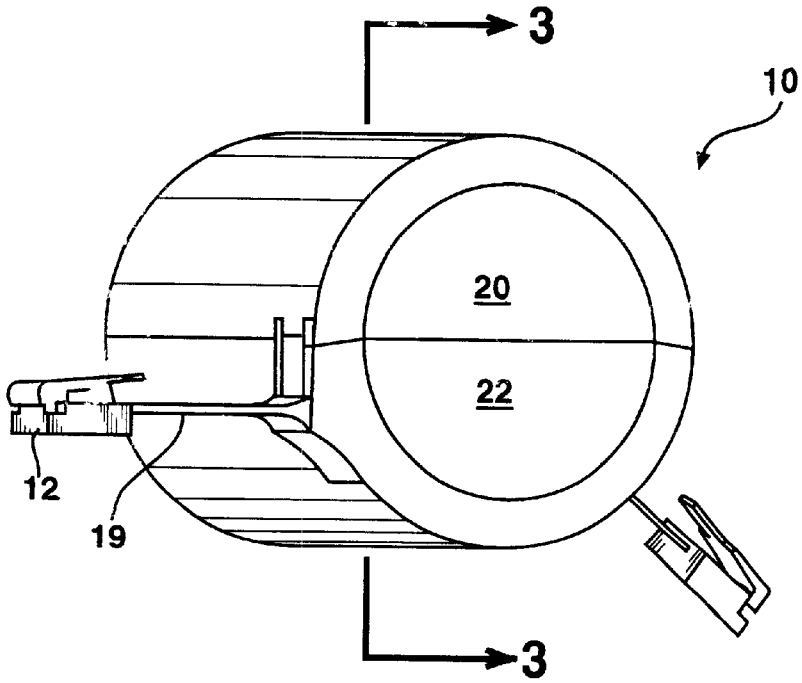
FIG. 2 AMENDED
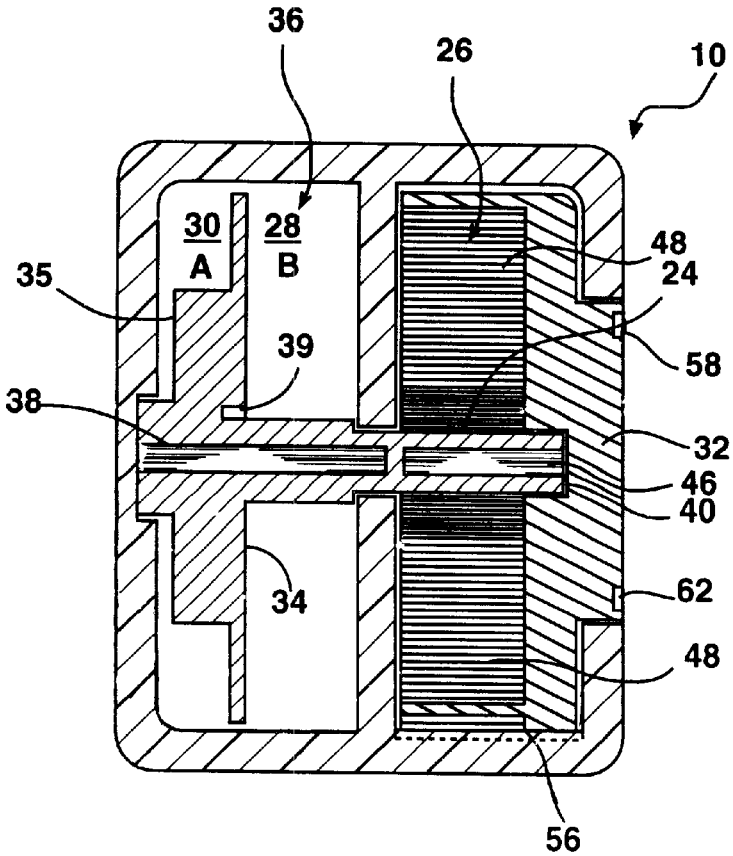
FIG. 3 AMENDED

SIDE A RETRACTED

SIDE B RETRACTED

SIDE A EXTENDED

SIDE B EXTENDED

UNI-DIRECTIONAL CORD TAKE-UP DEVICE

Matter enclosed in heavy brackets [ ] appears in the original patent but forms no part of this reissue specification; matter printed in italics indicates the additions made by reissue.

This application is a continuation-in-part of application Ser. No. 08/600,406, filed Feb. 12, 1996, now U.S. Pat. No. 5,655,726 for UNI-DIRECTIONAL CORD TAKE-UP DEVICE.

BACKGROUND OF THE INVENTION

1. Technical Field

This invention relates generally to take-up devices for electrical cords, and more particularly to those take-up devices for flat wire cables used in telephone communication and data transmissions.

2. Background

U.S. Pat. No. 5,230,481 (Wheeler et al.) discloses a dual reel cord take-up device for connecting a telephone and a cooperating handset. This device serves to connect the handset of a telephone to the body of the telephone with a device wherein the connecting cord is wound on a spool. This allows the user of the telephone to pick up the handset, move many feet away from the telephone, and still be connected by cable to the telephone body. Phone cable extends from both sides of the cord take-up device as the handset is moved away from the phone, and is wound back into both sides of the take-up device as the handset approaches the cradle. When the user returns the handset to the telephone, there is no pile of twisted and coiled extension cord. Instead, all of the phone cable is neatly wound back onto the dual-purpose shaft of the take-up device.

A feature of this system is that when the user of the handset returns the handset to its cradle, the dual-purpose shaft winds up the available cord. Just before the handset is placed on the cradle, the take-up reel, with its now much shortened external cable link, can contact the desk or table on which the telephone is situated. This contact can produce an audible clicking sound which the person on the other end of the telephone can hear.

There is a need to invent a device for feeding out electrical cable between a telephone and its handset, and for taking that cable up into a neat package, without having the take-up device be free floating between its attached ends, and without having the possibility of creating noise as the take-up device contacts objects during retraction and use.

DISCLOSURE OF INVENTION

What we have invented is a cord take-up device for flat wire phone cable which feeds out or takes up cable at only one of its two cable entry ports.

It includes a generally semi-cylindrical upper case half with two parallel compartments in a direction perpendicular to the axis of the cylinder, the first compartment being adapted to receive the first end of a dual-purpose [dual-purpose] shaft, and the second compartment being adapted to receive the second end of the dual-purpose [dual-purpose] shaft and a spring cup. The upper case half has snap-fit means for receiving a lower case half and means for receiving a flat wire cable.

Also provided is a generally semi-cylindrical lower case half, also with two compartments which correspond to the first and second compartments of the upper case half. The lower case half also has snap-fit means for receiving and cooperating with said upper case half snap-fit means. The lower case half has means for receiving a flat wire cable and has a second compartment with means for holding the spring cup in the second compartment against rotation in one direction but not the other.

Another feature of the invention is a dual-purpose shaft supported and held in rotatable relationship by both the upper and lower case halves. The dual-purpose shaft is provided on its first end in the first compartment of the upper and lower case halves with a slotted disk which divides the first end of the dual-purpose shaft into two adjacent chambers for receiving flat wire cable.

The flat wire cable extends through two apertures, with one cable end fixed in an aperture and the other cable end free to extend and retract through the other aperture.

The dual-purpose shaft has on its second end in the second compartment of the upper and lower case halves, a slot in the dual-purpose shaft for receiving a spring within the spring cup.

The device also contains a generally cylindrical spring cup within the second compartment of the upper and lower case halves, the spring cup having an outer surface perpendicular to its axis of rotation, means cooperating with the holding means to hold the cup against rotation relative to the upper and lower case halves in one direction but not in the other direction, and spring stop means on its inner cylindrical surface for foxing one end of the spring to the spring cup.

The device also contains a flat coil spring within the spring cup, the spring being fixed on its outer end to the spring cup and being fixed on its inner and end to the second end of the dual-purpose shaft.

Another feature of our invention is the inclusion of notches within the second compartment. These notches interact with the cooperating means of the spring cup, which are resilient prongs on its outer cylindrical surface.

Another feature of our invention is that the spring cup has detent means on its outer surface perpendicular to its axis of rotation for winding the spring.

Another feature of our invention is that the apertures in the lower case half are sufficiently large to permit the passage of flat wire cable in and out of the device, but are not large enough to permit the passage of a fold in the flat wire cable.

Another feature of our device is that the dual purpose shaft has a larger diameter in the cable extension and take-out reel than the diameter of the dual purpose shaft in the captive cable reel.

From the practice of our invention an improved phone cord take-up device is provided, wherein the device remains stationary in relationship to the telephone, and cable moves in and out of only one aperture of the device.

BRIEF DESCRIPTION OF THE DRAWINGS

FIG. 2 is a perspective view of our improved cord take-up device.

FIG. 3 is a cross-sectional view along line 3—3 in FIG. 2.

BEST MODE FOR CARRYING OUT INVENTION

Figure 1:
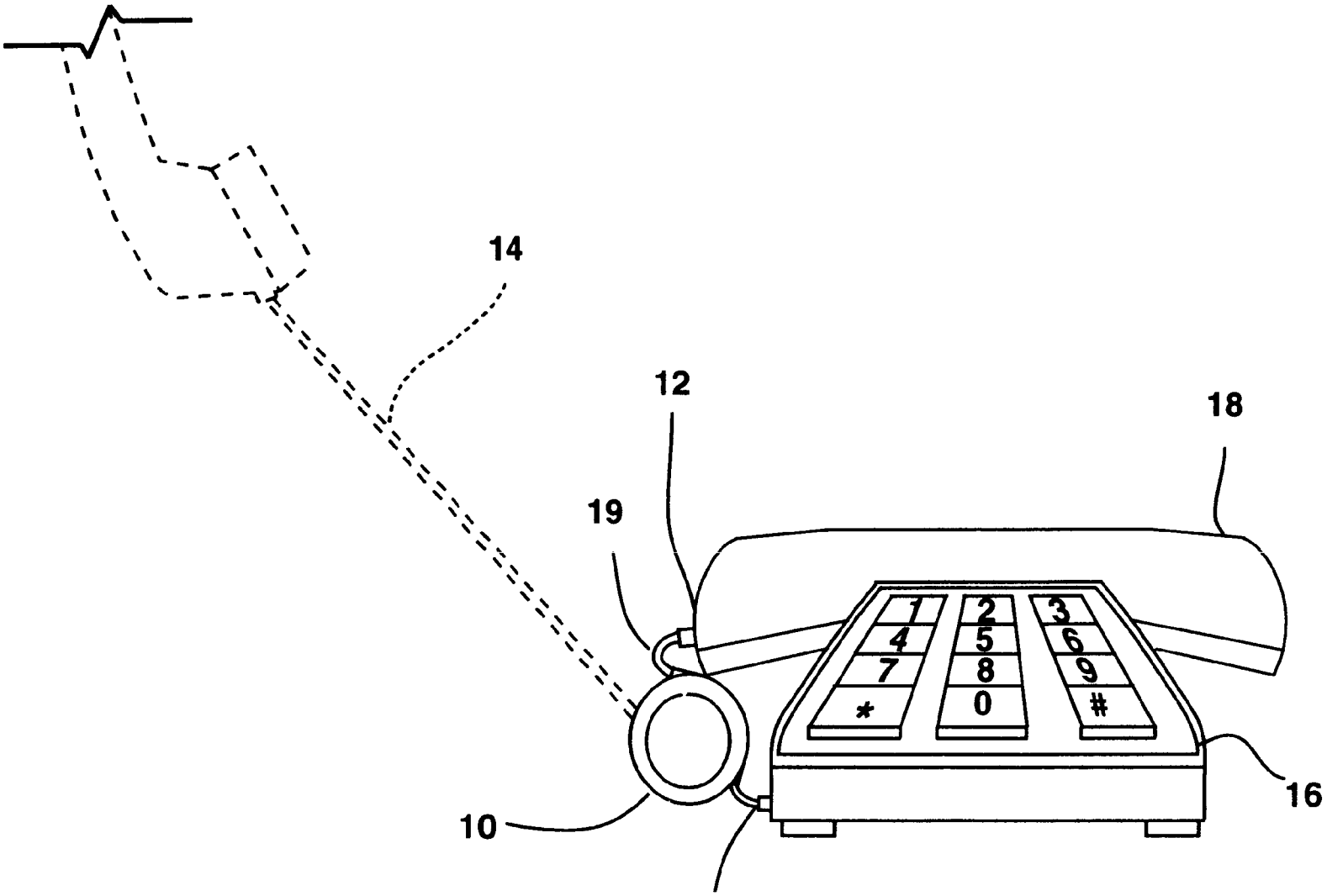
FIG. 1 is a front view of the telephone equipped with a uni-directional dual reel cord take-up device.
Figure 4:
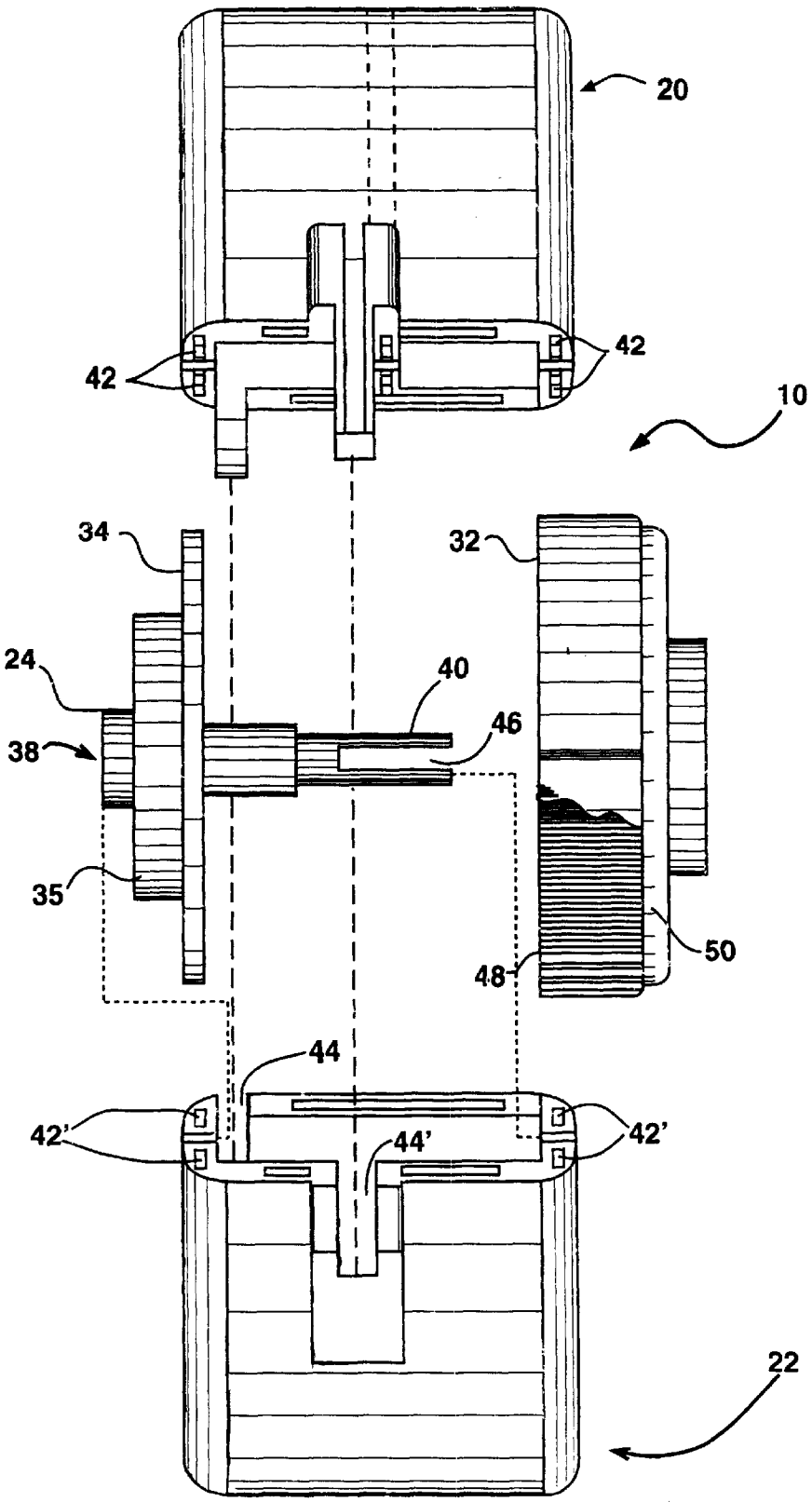
FIG. 4 is an exploded, partly cross-sectional side view of our improved cord take-up device.

Referring to the FIG. 1, there is depicted generally *one embodiment of* our improved uni-directional cord take-up device 10. When the phone handset 18 is removed from the phone 16, as shown in dotted lines, the device 10 stays attached to the phone 16. As shown in FIGS. 2, 3 and 4, generally semi-cylindrical upper case half 20 and lower case half 22 [snap fit] *come* together to form two parallel compartments, first compartment 36 and second compartment 26 inside take-up device 10. The two compartments are parallel in a direction perpendicular to the axis of the cylinder which the upper and lower case halves create. First compartment 36 is adapted to receive and support in rotatable relationship first end 38 of dual-purpose shaft 24. Likewise, second compartment 26 is adapted to receive and support in rotatable relationship second end 40 of dual-purpose shaft 24, as shown in FIG. 3.

Upper and lower case halves 20 and 22 both have cooperating snap-fit means 42 and 42' for receiving and cooperating with one another for retaining said upper and lower case halves in fixed mutual relationship, as shown in FIG. 4. Also, lower case half has means for receiving flat wire cable, apertures 44 and 44', in the walls of the lower case half *22*, or otherwise in the walls of the cord take-up compartments.

First end 38 of dual-purpose shaft 24 has a slotted disk 34 which divides the first compartment 36 into two adjacent compartments, 30 and 28, which we will call sides A and B, respectively, as shown in FIG. 3. In compartment 28 (Side B) is the captive[,] cable reel, and the flat wire cable 14 is wound or unwound by wrapping around, or unwrapping from, dual purpose dual-purpose shaft 24. Cable from compartment 28 (side B) extends a short distance outside of the case of device 10 and attaches to strain relief 19, phone jack 12, and the telephone 16. The case can be attached to the telephone so it is firmly anchored when in use. The cable which is wrapped around dual-purpose shaft 24 in compartment 28 (side B) never leaves the device 10, except for a short extension which connects to the phone 16.

Figure 5:
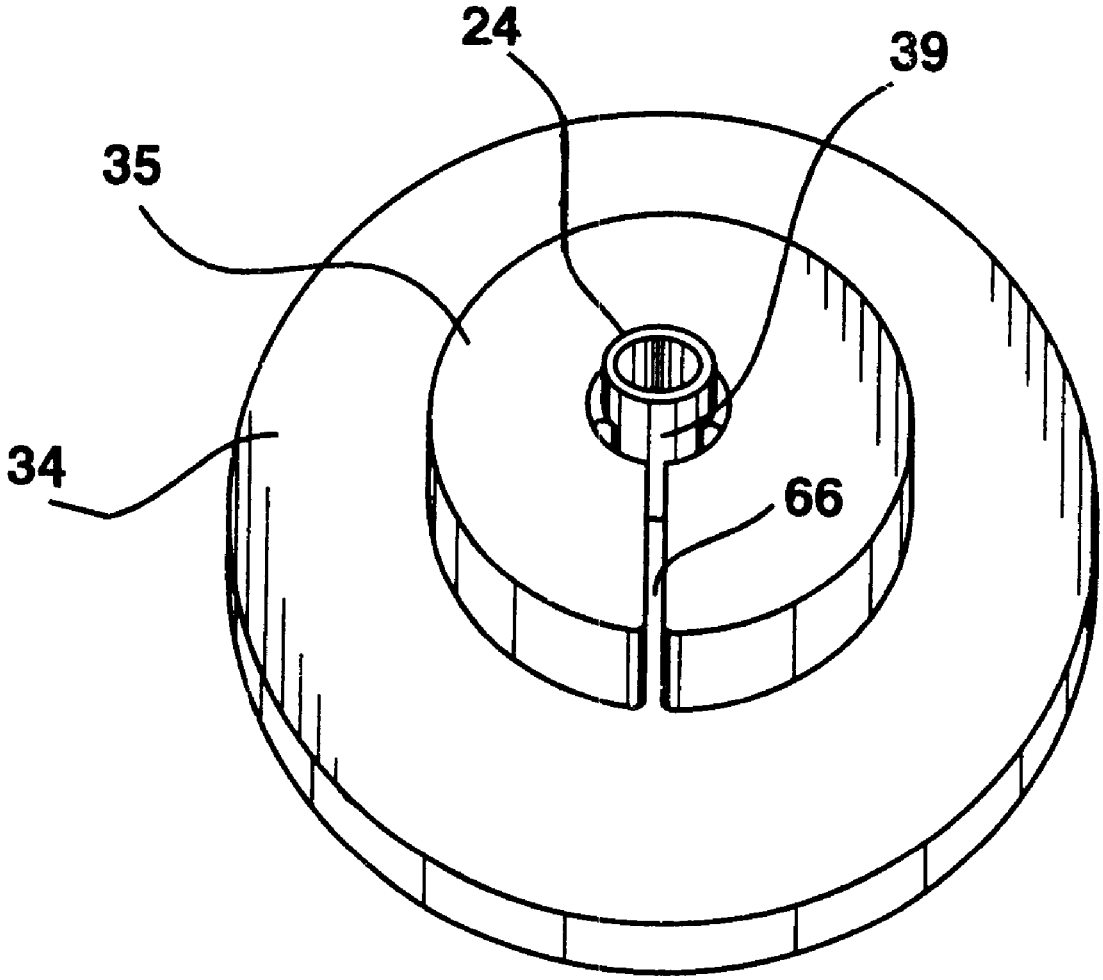
FIG. 5 is a perspective view of the disk which mounts on the dual-purpose shaft.

FIG. 5 shows slotted disk 34, with hub 35 and slot 66 shown. Slot 66 is for the passage of flat wire cable.

Figure 6:
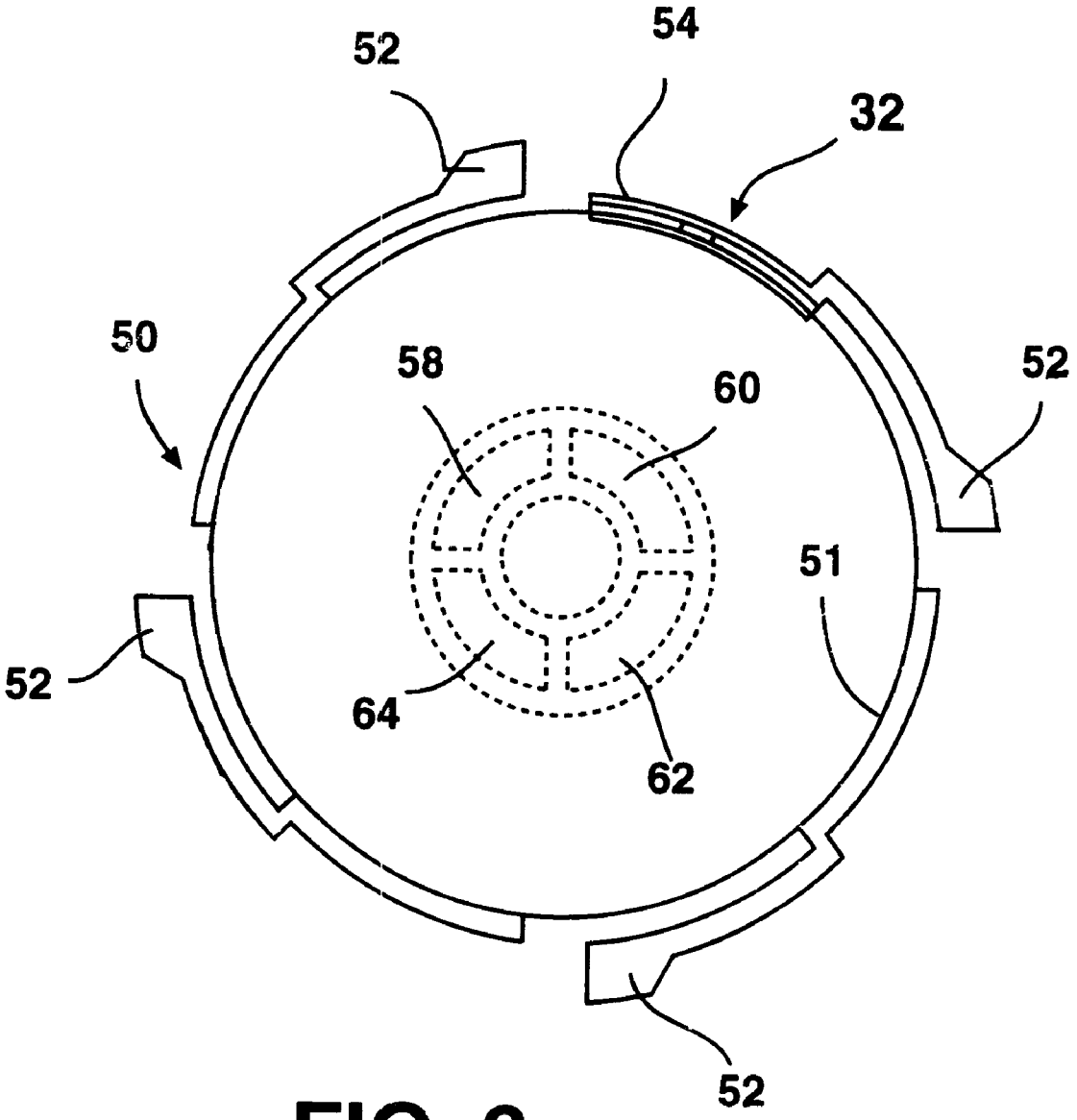
FIG. 6 is a side, outside view of the spring cup of our improved cord take-up device.

FIG. 6 shows the spring cup 32, with cooperating means 52 which are resilient prongs. It has an outer surface 50 with detents 58, 60, 62, and 64.

Figure 7:
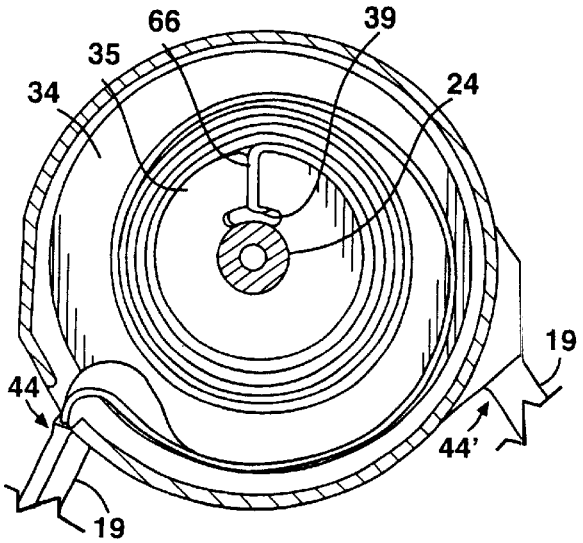
FIG. 7 is a cross-sectional view of compartment 30 looking toward second end 40.
Figure 8:
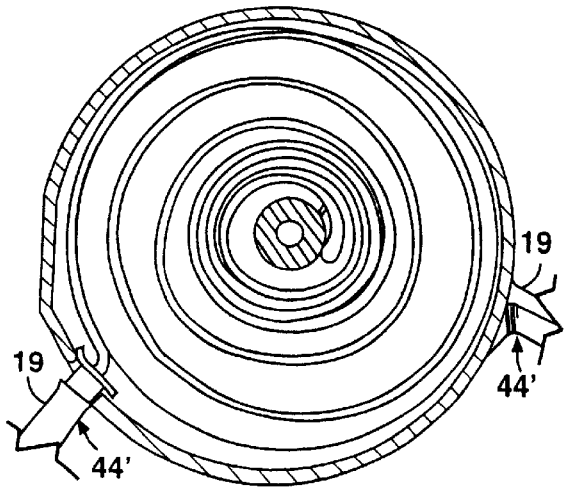
FIG. 8 is a cross-sectional view of compartment 28 looking toward first end 38.
Figure 9:
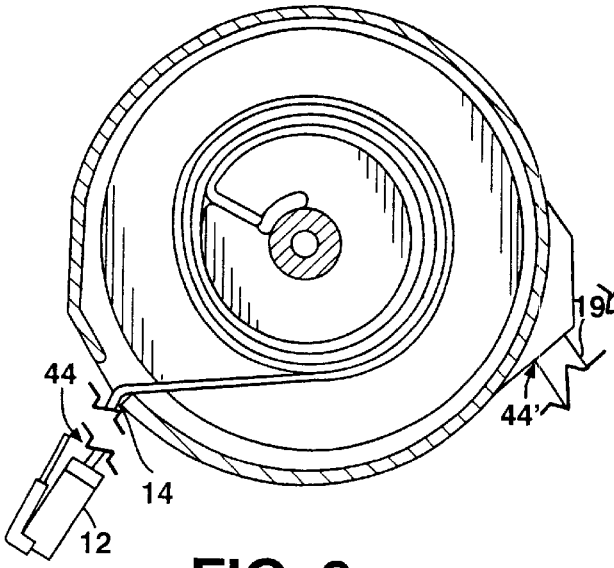
FIG. 9 is a cross-sectional view of compartment 30 looking toward second end 40.
Figure 10:
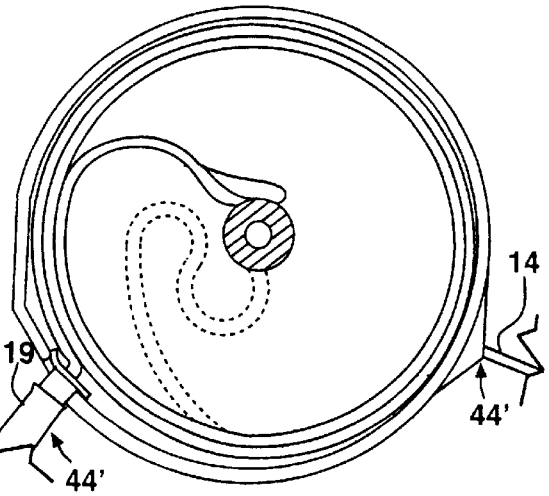
FIG. 10 is a cross-sectional view of compartment 28 looking toward first end 38.

The adjacent compartment 30 (side A) is the cable extension reel and contains flat wire cable 14 which extends outside of the reel case and attaches to the strain relief 19, phone jack 12, and handset 18. When the user picks up the handset 18 and brings it to his ear, or moves the handset 18 away from the phone 16, flat wire cable 14 from compartment 30 (side A) is dispensed from the dual-purpose shaft 24 through aperture 44. This is shown in FIGS. 7 and 9, which are cross-sectional view of compartment 30 (side A), looking from the [second end 40] *first end 38* toward the [first end 38] *second end 40* of dual-purpose shaft 24. FIG. 8 shows the device 10 with the cable of compartment 28 (side B) when the cable of compartment 30 (side A) is fully retracted within the device and wrapped around dual-purpose shaft 24. FIG. 10 shows the cable in compartment 28 (side B) when the cable from compartment 30 (side A) is fully extended outside the compartment 30 (side A) and wound off of dual-purpose shaft 24.

Dual-purpose shaft 24 is connected to flat coil springs 48 at slot 46. Flat coil spring 48 is housed in compartment 26 of device 10.

Flat coil spring 48 is of a type of spring known as a constant force spring or a negator spring. A negator spring is best understood when it is compared to a power spring. A power spring is a flat coil spring which at rest forms a uniform spiral with many turns being evenly spaced from the center to the outside of the spring. An example of a power spring is the spring which is used in watches. Due to the shape of a power spring, more and more torque is required to wind successive layers around the center shaft. As most of the spring has become wound on to the center shaft, the last few coils require significantly more force to wind on to the center shaft.

A negator spring, by comparison, is actually a power spring which is wound backwards. The result of this is that a negator spring, when it rests, presses against its container, and its coils are as far from the center hub as they are allowed to go. The result of this design is that as the center shaft rotates and pulls coils of the spring from the outside to wrap around the center shaft, it takes about as much torque to pull one coil in as it does to pull later coils. Although this torque may not be completely constant, it is reasonably constant, and much more constant than the torque variations of a power spring. The use of a negator spring in this device is significant because it allows the torque applied by the flat coil spring 48 to be fairly constant no matter how much flat wire cable 14 is extended from the spring. This uniform torque on the flat wire cable 14 significantly improves its life span, by not over-stressing this delicate cable.

As flat wire cable 14 is extended from compartment 30, it causes dual-purpose shaft 24 to rotate, which in turn causes flat coil spring 48 to be wound onto dual-purpose shaft 24. Flat coil spring 48 is sized so that when the spring is fully wound on to dual-purpose shaft 24, several turns of flat wire cable 14 remain around dual-purpose shaft 24 in compartment 30 (side A) as shown in FIG. 9 and the flat wire cable in compartment 28 (side B) is pressed against the outside of compartment 28 but has not begun to reverse wrap around dual-purpose shaft 24, as shown in FIG. 10.

An important feature of the design of this device is that when the cable in compartment 30 (side A) is fully extended, the flat wire cable in compartment 28 (side B) extends out from dual-purpose shaft 24 at not more than a 90 degree angle. If dual-purpose shaft 24 were allowed to rotate clockwise even one half of a revolution further, a loop would develop in the flat wire cable adjacent to dual-purpose shaft 24. This loop is shown in FIG. 10 as a [dotted] *dashed* line. Formation of this loop causes a reverse flexing of the flat wire cable 14 and leads to premature failure of the cable. The relationship between the revolutions allowed by the spring 48, the thickness of the flat wire cable [19] *14*, and the diameter of dual-purpose shaft 24 in compartment 30 and compartment 28 is carefully controlled to prevent the formation of this loop.

As flat wire cable 14 is retracted into the device 10, the opposite sequence of events occurs. As the handset 18 is returned to the telephone 16, the flat wire cable 14 which is connected to it is reeled on to the dual-purpose shaft 24 in compartment 30 (Side A), and the rotation of the dual-purpose shaft 24 causes the flat wire cable 14 in compartment 28 (Side B) to rewind onto dual-purpose shaft 24.

Apertures 44 and 44' are constructed to be large enough to allow the passage of flat wire cable through the apertures, but are not large enough to allow the passage of folded or kinked flat wire cable. In this way, a kink or twist in the cable is not allowed to pass through the aperture 44 or [44[1]] *44'* and be wound onto the dual-purpose shaft 24. *Further, and as illustrated, the apertures 44, 44' may be positioned on the lowercase half 22, or otherwise on the cord take-up device 10, in a diametrically offset orientation. In other words, the aperture 44, for example, may be located on the cord take-up device 10 at a location offset from a point diametrically opposed to a location of the other aperture 44'.*

On dual-purpose shaft 24 is mounted slotted disk 34. Preferably, the axial surface of dual-purpose shaft first end 38 is an enlarging spiral in the direction of rotation when cable is being added to the dual-purpose shaft *24*. This way, the roll-up and roll-down action of the take-up device is smoothed in the area of radial slot 66 where the first complete wrap of cable encounters the initial layer of cable.

The [dual-purpose shaft] diameter of dual-purpose shaft 24 is different in compartment 28 and compartment 30. This can be accomplished by use of a hub 35 mounted on dual purpose shaft 24, which results in a larger diameter surface for cable take-up. The complete tensioning of the flat coil spring [49] *48* which is attached to dual-purpose shaft 24 is a physically limiting factor of the device. Depending on the length of the flat coil spring 48, the spring will allow a certain number of revolutions of the dual-purpose shaft 24 as flat wire cable 14 is extended out from the device 10 from compartment 30. It is desired that when this fixed number of revolutions has occurred, and coil spring 48 is fully wound, that the appropriate [length] *lengths* of cable remain in [compartment] *compartments* 28 and 30 around dual-purpose shaft 24. To determine the length of cable which should be placed in *each of* compartments 28 and 30, the cord thickness is a variable, as well as the diameter of the dual-purpose shaft 24, and the number of revolutions of dual-purpose shaft 24 which are allowed by the spring *48*. In the best mode of the invention flat coil spring 48 is 16 feet in length and allows 31 revolutions of dual-purpose shaft 24. Flat wire cable [19] *14* is 0.020 inches in thickness, and the diameter of dual-purpose shaft 24 or hub 35 in compartments 28 (side B) and 30 (side A) varies depending on the amount of flat wire cable 14 which is to be extended. In a model of the device in which 12 feet of flat wire cable *14* can extend from compartment [28] *30*, the *diameter of* dual-purpose shaft 24 or hub 35 [diameter] in compartment 30 (side A) is 1.6 inches [in diameter]. In that model, the *diameter of* dual-purpose shaft 24 [or hub 35 diameter] in compartment 28 (side B) [of dual-purpose shaft 24] is 0.250 inches [in diameter]. In this particular model, compartment 30 (side A) contains 13 feet of flat wire cable [19] *14* and compartment 28 (side B) contains 8 feet of flat wire cable [19] *14*.

In a model of device 10 from which 24 feet of flat wire cable 14 is to be extendible from compartment 30 (side A), *the* diameter of dual-purpose shaft 24 or hub 35 in compartment 30 (side A) is 2.6 inches. The *diameter of* dual-purpose shaft 24 [diameter] in compartment 28 (side B) for this particular model is 0.250 inches. In this model, there are 25 feet of flat wire cable 14 in compartment 30 (side A) and 12 feet of flat wire cable 14 in compartment 28 (side B).

In second compartment 26, the second end 40 of dual purpose [dual-purpose] shaft 24 has diametric slot 46 for receiving the inside end of coiled flat spring 48. Flat coil spring 48 is received and fixed at its outside end by spring cup 32 contained within second compartment 26. Spring cup 32 is generally cylindrical with an outer cap surface 50 perpendicular to its axis of rotation, cooperating means 52 which are resilient prongs on its outer cylindrical surface and spring stop means 54 on its inner cylindrical surface. Cup cooperating means 52 is received by and cooperates with second compartment holding means 56 which are notches in the inner cylindrical wall of the second compartment. In this way, spring cup 32 is held against rotation except to tighten the spring 48, so the dual-purpose shaft 24 is continually [under tension to rotate away] *subject to a rotational bias* from the spring [tension] *48* and *able to* retrieve the cable *14* into the first take-up compartment 36.

Also, preferably, spring cup outer cap surface 50 has detents 58, 60, 62 and 64 to permit engagement therein of a simple spanner type tool end for initially tightening the flat coil spring 48. This way, our take-up device may be more easily assembled.

Our take-up device components may be made from plastic or other polymeric materials by conventional molding means.

To assemble our invention, first cable 14 is passed through radial slot 39 of disk 34 and each end is led out apertures 44 and 44'. On the tips of each end of the cable is placed a strain relief device 19 and the electrical connection 12 to attach to the phone and the handset. Then, flat coil spring 48 is engaged on its inside end in diametric slot 46 of dual-purpose shaft 24, and on its outside end in *spring stop means 54 of* spring cup 32, [spring stop means 54,] and the dual-purpose shaft 24 and spring cup 32 are placed between upper and lower case halves 20 and 22, respectively. Then, the case halves are [snapped] *secured* together, and detents 58, 60, 62 and 64 are engaged, and turned to tighten the flat coil spring 48 and wind the cable 14 onto dual-purpose shaft 24 in compartments 30 and 28.

While there is shown and described the present preferred embodiment of the invention, it is to be distinctly understood that this invention is not limited thereto but may be variously embodied to practice within the scope of the following claims.

We claim:

1. A dual reel cord take-up device for flat wire cable which comprises:

[(a)] a generally semi-cylindrical upper case half with two parallel compartments in a direction perpendicular to [the] *an* axis of the [cylinder] *upper case half*, [the] *a* first compartment *of said two parallel compartments* being adapted to receive [the] *a* first end of a dual-purpose shaft, and [the] *a* second compartment *of said two parallel compartments* being adapted to receive [the] *a* second end of said dual-purpose shaft and a spring cup, said upper case half having snap-fit means for receiving a lower case half and means for receiving a flat wire cable;

[(b)] a generally semi-cylindrical lower case half, also with two compartments which correspond to *said* first and second compartments of the upper case half, said lower case half also having snap-fit means for receiving and cooperating with said upper case half [snap-fit means for receiving] and *for* retaining said upper case half in fixed relationship *with said lower case half*, said lower case half *also* having means for receiving a flat wire cable [and]

*said first and second upper half compartments configured to connect with said lower half compartments to form a first device compartment and a second device compartment,* said second *device* compartment having *holding* means for holding said spring cup in said second *device* compartment against rotation in one direction but not [the other] *in an opposing direction*;

[(c) a] *said* dual-purpose shaft supported and held in rotatable relationship by both the upper and lower case [halves] *half compartments*, the dual-purpose shaft being provided on its first end in the first *device* compartment [of the upper and lower case halves] with a slotted disk which divides the first end of the dual-purpose shaft into two adjacent reels for receiving flat wire cable, in which [the] *one of said* two adjacent reels [are] *is* called a cable extension and take-up reel and *another of said two adjacent reels is called* a captive [cable] reel;

[(d) the slotted disk further dividing the first compartment into two adjacent compartments, the] *said* flat wire cable [extending] *extends* through two apertures [with] *in said first device compartment* one [cable] end *of said flat wire cable* fixed in [an] *one* aperture, and [the other cable] *another* end *of said flat wire cable* free to extend and retract through [its] *a second* aperture *of said two apertures*, the dual-purpose shaft being provided on its second end in the second compartment of the upper and lower case halves with a slot in the dual-purpose shaft for receiving a spring within the spring cup[;

(e) a generally cylindrical], *said* spring cup *disposed* within [the] *said* second *device* compartment [of the upper and lower case halves], [the] *said* spring cup having an outer surface perpendicular to its axis of rotation[,]*;* means cooperating with the holding means *of said second device compartment* to hold the *spring* cup against rotation relative to the upper and lower case halves in *said* one direction but not in [the other] *an opposing* direction, and spring stop means on [its] *an* inner [cylindrical] surface *of said spring cup* for fixing one end of the spring to the spring cup; and

[(f)] a flat coil spring *disposed* within the spring cup, the spring being fixed on its outer end to the *spring* stop means of the spring cup and being fixed on its inner end to the slot of the second end of the dual-purpose shaft, the flat coil spring being sized in relation to [the] *a* length of the flat wire cable so that when the flat coil spring is completely wound on the dual purpose shaft, the flat wire cable [from] *on* the cable extension and take-up reel still has several winds remaining around the dual purpose shaft, and the flat wire cable on the captive [cable] reel is pressed against the walls of the upper and lower [case halves] *half compartments of the first device compartment*, and has not begun to reverse wind.

2. The take-up device of claim 1 wherein the holding means in the second *device* compartment [are] *comprise* notches [, which notches] *configured to* cooperate and interact with the cooperating means of the spring cup [which are], *said cooperating means comprising* resilient prongs on [its] *an* outer cylindrical surface *of said spring cup*.

3. The take-up device of claim 1 wherein the spring cup has detent means on [its] *said* outer surface *thereof* perpendicular to [its] *said* axis of rotation *of said spring cup* for winding the *flat coil* spring.

4. The take-up device of claim 1 wherein the *two* apertures in the [lower case half] *first device compartment* are sufficiently large to permit the passage of *said* flat wire cable, but are not large enough to permit [the] passage of folded flat wire cable.

5. The take-up device of claim 1, wherein the dual-purpose shaft has a larger diameter in the cable extension and [take-out] *take-up* reel than [the] *a* diameter of the dual-purpose shaft in the captive cable reel.

* * * * *